United States Patent [19]

Hanamura et al.

[11] Patent Number: 4,784,472
[45] Date of Patent: Nov. 15, 1988

[54] OPTICAL CONTROL SYSTEM AND METHOD

[75] Inventors: Eiichi Hanamura; Tetsuji Tokihiro, both of Tokyo, Japan

[73] Assignee: Mitsubishi Petrochemical Co., Ltd., Tokyo, Japan

[21] Appl. No.: 774,094

[22] Filed: Sep. 9, 1985

[30] Foreign Application Priority Data

Feb. 20, 1985 [JP] Japan .................................. 60-33510

[51] Int. Cl.$^4$ ............................ G02B 5/23; G02F 1/01
[52] U.S. Cl. ........................................ 350/354; 372/8; 372/21
[58] Field of Search .................... 350/353, 354; 372/8, 372/21

[56] References Cited

U.S. PATENT DOCUMENTS 3,813,605  5/1974  Szoke ........................................ 372/8
4,558,923 12/1985  Hoffman et al. ...................... 350/354
4,597,638  7/1986  Chemla et al. ......................... 350/354

OTHER PUBLICATIONS

Haug "Theory of Resonance Enhanced Optical Nonlinearities in Semiconductors", *Optical Bistability* 2, Edited by Bowden pp. 249-258, 1984.
Kittel "Introduction to Solid State Physics", pp. 612-622, 1971.
Mita et al. "Exciton Spatial Dispersion Determined Through the Two-Photon Raman Scattering Via Excitonic Molecule State at Large Wave Vectors in CuCl", Solid State Communications, vol. 33 pp. 1135-1138.
Streetman "Solid State Electronic Devices", pp. 46-49 and 57, 1980.
Fink "Standard Handbook for Electrical Engineers", May 6, 1974 pp. 4-264 to 4-267.
CRC Handbook of Chemistry and Physics 66th edition, Oct. 17, 1985 pp. E-99 to E-102.
Peyghambarian et al. "Optical Nonlinearity and Bistability Due to the Biexciton Two Resonance in CuCl", *Optical Bistability* 2, Plenum Press 1984.
Bohnert et al. "Intrinsic Absorptive Optical Bistability in CdS", Appl. Phys. Lett. vol. 43 (12) Dec. 15, 1983 pp. 1088-1090.

*Primary Examiner*—Eugene R. Laroche
*Assistant Examiner*—Michael B. Shingleton
*Attorney, Agent, or Firm*—Donald D. Mon; David O'Reilly

[57] ABSTRACT

An optical control system and method comprised of obtaining optical bistability by radiating a crystal with both the exciton energy level and the excitonic molecule energy level as the optical excitation energy level, with a laser beam having energy less than $(Em/2-\gamma)$, in which Em is the excitonic molecular energy level, an $\gamma$ is the half-amplitude level of absorption spectrum of two-photon resonance. The advantage of optical bistability is that high speed switching of an order of picoseconds is possible due to the coherent non-linear response, and that switch-on and switch-off energy required is less than pico-Joule.

6 Claims, 4 Drawing Sheets

F I G. 5(a)
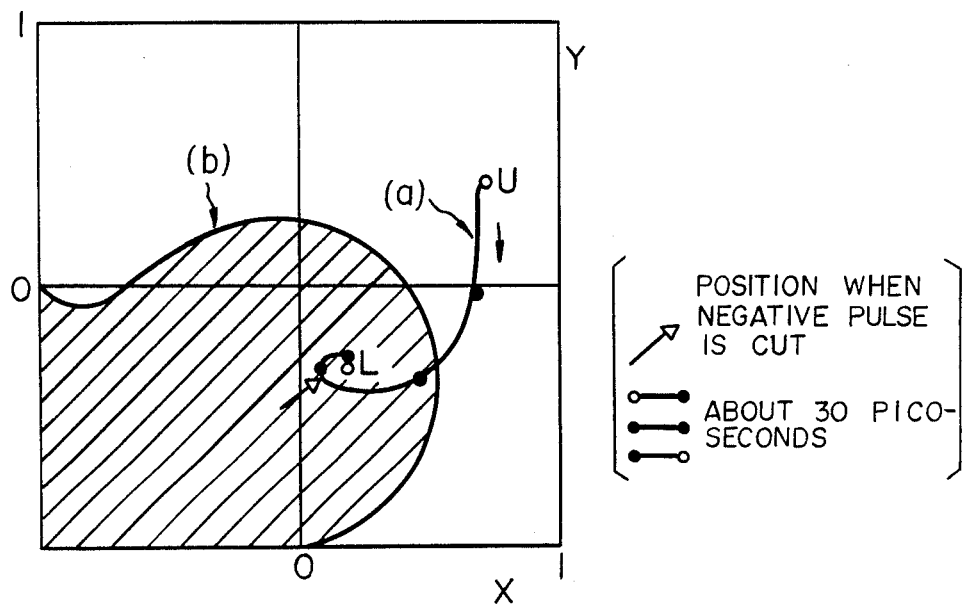
F I G. 5(b)
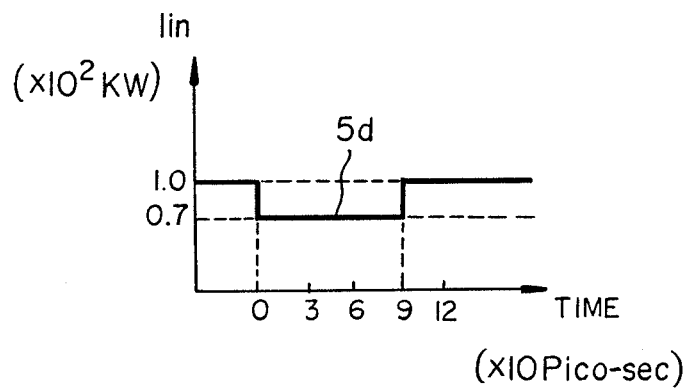

OPTICAL CONTROL SYSTEM AND METHOD

FIELD OF THE INVENTION

This invention relates to a method for obtaining optical bistability for control purposes.

BRIEF DESCRIPTION OF THE INVENTION

This invention relates to an optically controlling method which is used in optical communication, in optical information processing, an optical computers, etc., and in utilizing optical bistability due to the coherent optical nonlinear response of the excition-excition molecule system.

Recently, research has been conducted in the application of optical bistability to information processing and optical computers. At present, the majority of electronic computers are comprised of LSIs in which circuit elements such as transistors, diodes, resistors, etc. are integrated in large scale high-density on a silicon single-crystal. Further, tunneltron or cryotron to which superconduction phenomenon is applied are sometimes used.

In order to make possible the use of optical control which has better characteristics than the above-mentioned electronic devices, it is desired that optical bistability satisfies the following three conditions.

(a) The switching of the optical bistability between low transmitting state and high transmitting state must be performed in the shot time of an order of pico-second;

(b) The amounts of energy required for the switching-on or -off must be less than pico-Joule; and (c) Holding power must be less than a milliwatt.

Various researches have been done to realize the optical bistability which can satisfy the above-mentioned three conditions. According to one of these researches, dispersive optical bistability due to the change of refraction depending on the intensity of laser beam has been reported (H. M. Gibbs, et al., Optics News-/Summer (1976) 6), in which excitons of GaAs are formed really, and the change of index of refraction is given by the presence of excitons with the finit density.

Therefore, in this case, the incoherent nonlinear response is obtained predominantly, and even though the switching-on can be performed within the time of an order of pico-second, the switching-off must be performed after the decay time of the exciton of an order of a nano-second.

Recently, the optical bistability due to the exciton-excitonic molecule of CuCl has been repoted (N. Peygham barian et al., Phys. Rev. Lett, 51 (1983) 1692; B. Honerlage, et al., Optical Bistability in Cucl in *Optical Bistability II*, C. M. Bowden, et al. eds., Plenum Press, 1983), in which it is though that the incoherent nonlinear response is mixed, because the two-photon transition becomes almost resonant state for the excitonic molecules, even though the one-photon transition becomes off-resonant state for the excitons. Therefore the response is 100 pico-seconds under 20 MW/cm$^2$ holding power. This optical bistability cannot satisfy the abovementioned three conditions.

The object of the invention is to provide an optically controlling method that satisfies the above-mentioned three conditions, due to the coherent optical nonlinear respnse of a the exciton-excitonic molecule system.

BRIEF DESCRIPTION OF THE DRAWINGS

FIGS. 3, 3(a) and 3(b) are graphs of the input-output characteristic of the resonator;

FIGS. 4(a) and 5(a) are graphs of the curve of the dynamic characteristic of the resonator; and FIGS. 4(b) and 5(b) are graphs of the pulse of an incident light to the resonator.

DETAILED DESCRIPTION OF THE INVENTION

The inventors herein have found that a coherent nonlinear optical response can be obtained predominantly by irradiating an exciton-excitonic molecule system crystal, with a laser beam having energy with which the one-photon transition becomes off-resonant to an exciton, and the two-photon transition becomes also off-resonant to an excitonic molecule, so that the excellent optical bistability can be obtained.

This invention is characterized in that the optical bistability can be obtained by irradiating the crystal with a laser beam having energy (E) less than (Em/2−γm), in which Em is the excitonic molecule energy level (FIG. 1), and γm is the width at half maximum of two photon absorption spectrum.

Preferably, E≦(Em/2−Δν−γm), in which Δν is the spectrum width of a laser beam used as incident light. More preferably, (Em/2−100 γm)≦E≦(Em/2−Δν−rm).

Moreover preferably, (Em/2−50 γm)≦E≦(Em/2−Δν−2γm). Especially preferably, (Em/2−25 γm)≦E≦(Em/2−Δν−3γ).

The crystal used in this invention, the optical excitation level, and the optical bistability in which the coherent nonlinear optical response can be obtained predominantly, and the optically controlling method are explained.

The crystal

Crystals can be used in this invention which have both the exciton energy level and the excitonic molecule energy level as the optical excitation energy level and have good crystallinity to such a degree that the excitonic molecule energy level can be sharply observed, and in which impurity concentration is low.

In these crystals, the effective mass ratio of electron to hole ($m_e$, $m_h$) deviates largely from 1:$m_e/m_h > 1$; or $m_e/m_h < 1$. The electrostatic dielectric constant ($\epsilon_o$) is comparatively low. Therefore, both the excitons and the excitonic molecules exist stably in the crystals. Preferably, the crystal in this invention is copper halide, such as CuCl, CuBr, CuI. etc. More preferably, CuCl crystal is the most suitable. As the crystals, the single-crystal or the crystalline thin film is desirable. These crystals can be prepared by well-known techniques such as vapor phase deposition mehntods, zone-melting methods, etc.

Optical exitation state

Figure 1:
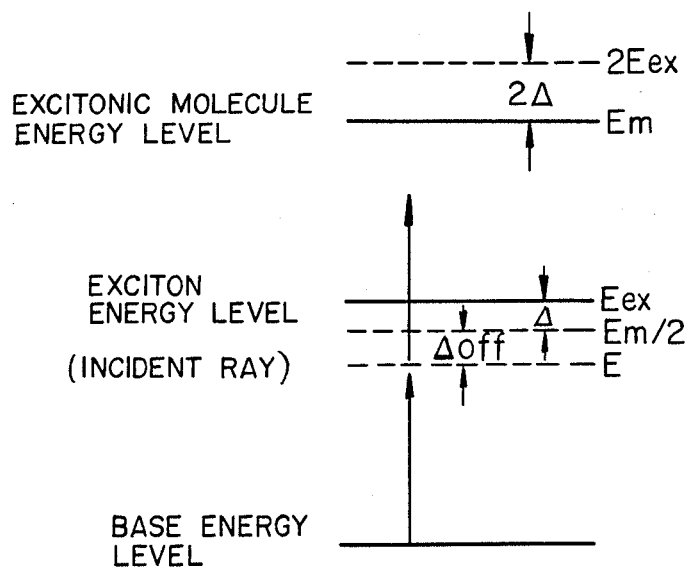
FIG. 1 is an explanation view of the state of an optical excitation in this invention.

The crystal used in this invention has both the exciton energy level and the excitonic molecule energy level as the optical excitation energy level. Namely, the crystal can be described by an three-energy level model as shown in FIG. 1 where the base energy level is the ground or zero state as shown in FIG. 3. The exciton energy level Eex, the excitonic molecule energy level Em, and the stabilization energy $2\Delta$ can be obtained from the peak of the one-photon specturm and that of the two-photon spectrum. Further $\gamma m$ can be obtained as the width at half maximum of the two-photon absorption spectrum. $\gamma m$ depends on quality of the crystal and the intensity of incident light.

The exciton-excitonic molecule system makes possible the two-photon resonance in which the exciton energy level is the intermediate state, and the excitonic molecule energy level is the final state. Due to the resonance effect and the giant oscillator effect which is proper to the system (E. Hanamura, Solid State Comm. 12 (1973) 951), the very great nonlinear optical response can be observed in the region of the two photon resonance energy level. The coherent nonlinear optical response and the optical bistability.

Figure 2:
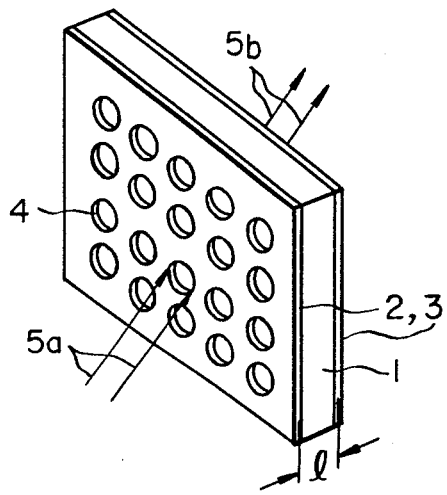
FIG. 2 is a perspective illustration of the Fabry-Perot resonator.

In the exciton-excitonic molecule system, the nonlinear optical response can be classified into the incoherent processand the coherent process. The incoherent process is the process in which the excitonic molecules can be formed really in the crystal, and requires about the longitudinal relaxation time (the relaxation time of distribution), generally an order of nano-second. The coherent process is the process in which the excitonic molecules can be for virtually, and requires about the transverse relaxation time (the relaxation time of polarization), generally, an order of pico-second. By this coherent process, the excellent opticalbistability can be realized. The coherent process can be realized by irradiating, to the crysta, off-resonant laser beam with energy enought lower than the two-photon resonance frequency. For example, using the Fabry-Perot resonator as shown in FIG. 2 in which a pair of reflective thin films are formed respectively at the front and the back of the crystal 1 with the thickness l, the optical bistability can be obtained. The characteristic of this resonator can be evaluated quantitatively by solving the equation of motion of nine physical quantities derived from the exciton polariton, and the Hamiltonian of the excitonic molecule system, with the boundary condition for incident light 5a, transmitting light 5b, and inside polariton field at both sides of the rsonator. The physical quantities are as follows.

The forward wave (wave number $\vec{K}_o$) and the backward wave ($-\vec{K}_o$) of the exciton polariton which can be formed macroscopically (quantum of the hybridized wave of the exciton and the photon);

The distributions of the excitonic molecule at three wave numbers $-2\vec{K}_o, \vec{0},$ and $+2\vec{K}_o$; and Four nonlinear polaritons of nonlinear polarized wave accompanying the transition between the exciton polariton and the excitonic molecule (the exciton polariton of $\vec{K}_o \longleftrightarrow$ the excitonic molecule of $2\vec{K}_o$, the exciton polariton of $\vec{K}_o \longleftrightarrow$ the excitonic molecule of $\vec{0}$, the exciton polariton of $-\vec{K}_o \longleftrightarrow$ the excitonic molecule of $-2\vec{K}_o$).

The equation of motion of these physical quantities shows both the coherent process and the incoheren process which conflict with each other. In the former, the nonlinear polarition is formed coherently in proportion to the intensity of the exciton polariton, by which the sensitivity rate is changed. In the latter, the incoherent nonlinear polariton is formed by the excitonic molecule which is distributed actually due to the two-photon absorption, by which the susceptibility is changed.

The dynamnic characteristic, such as the switching speed, the switching energy, can be evaluated by the non-steady solution of the equation of motion. The confliction state of the coherent process to the incoherent pro-cess, and the holding power can be evaluated by the steady solution. As parameters contained in the equation of motion, the experimental relation of dispersion between the exciton polariton and the excitonc molecule measured by the hyper-Raman scattering and experimental two-photon absorption coefficient measured by two-photon absorption spectrum can be employed.

Figure 3A:
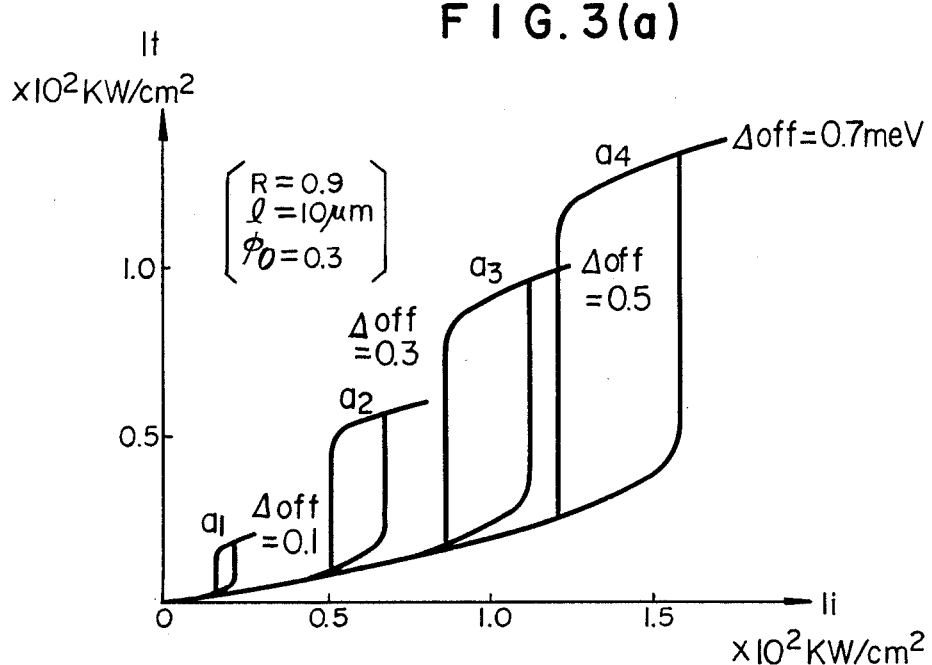
Figure 3B:
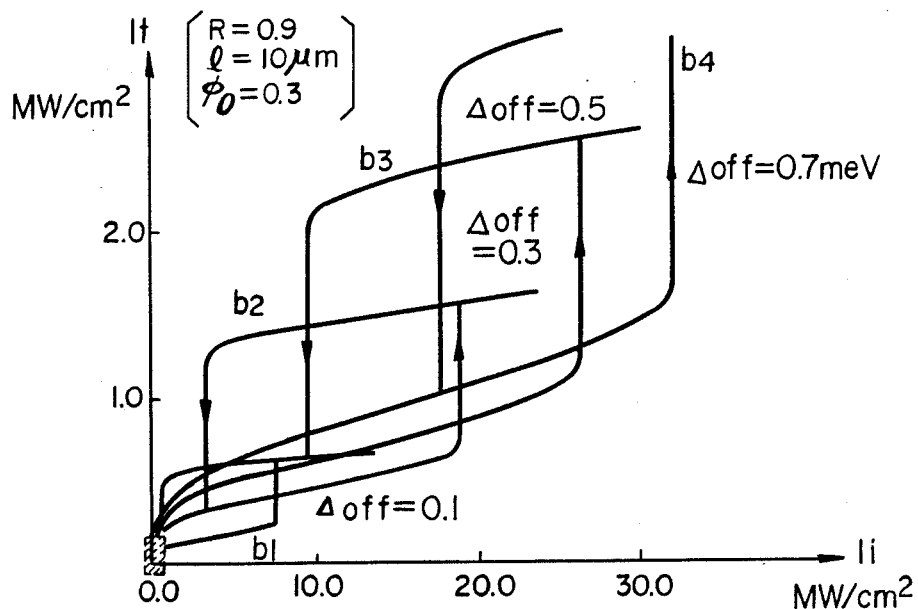

(a) The confliction of the coherent process to the incoherent process, and the holding power The change of the phase $(\phi)$ when transmits back and forth through the Fabry-Perot resonator is shown as $\phi = \phi_o + \Delta\phi$, wherein $\phi_o$ is a component independent on the intensity of the transmitting light, and $\Delta\phi$ is a component dependent on the intensity of the transmitting ray, according to the nonlinearity of the medium. And $\Delta\phi$ is shown as $\Delta\phi = \Delta\phi^{(c)} + \Delta\phi^{(inc)}$, wherein $\Delta\phi^{(c)}$ is a component to the coherent process, and $\Delta\phi^{(inc)}$ is a compont to the coherent process. The confliction state of the coherent process to the incoherent process, namely, the confliction state of $\Delta\phi^{(c)}$ to $\Delta\phi^{(inc)}$ can be evaluated by the steady solution. This confliction state depends on the degree of off-resonance ($\Delta\text{off}$) of the incident light from half of the excitonic molecule energy level ($\Delta\text{off} = Em/2 - E$). The coherent process becomes dominant, as $\Delta\text{off}$ increases. However, as $\Delta\text{off}$ increases, it is necessary to increase the intensity of the incident light. At this time, when $\Delta\text{off} > \gamma m$, the one-photon transition becomes off-resonant to the exciton, and the two-photon transition becomes off-resonant to the excitonic molecule. In this invention, the optical bistability is performed by irradiating, to the crystal, the above-mentioned light so that the coherent process becomes dominant. Furthermore, the input-output characteristic (the relation of the intensity of the incident light Ii to the intensity of the transmitted light It) can be evaluated by the steady solution, as shown as curves a1, a2, ..., b1, b2, ... in FIGS. 3(a) (b). FIG. 3(a) shows the coherent optical bistability, and FIG. 3(b) shows the incoherent optical bistability. From this input-output characteristic, the holding power can be obtained. In this invention, an order of milliwatt is sufficient for the holding power, as shown in the example of this invention.

(b) The time of switching-on or -off and the switching energy

By irradiating, continuously and steady to the resonator, the off-resonant light ($\Delta\text{off} < \gamma m$; holding light), the optical bistable state can be set to the resonantor. Then, pulse light with the wave length equal to that of the holding light is irradiated so that the light intensity is increased or decreased. The dynamic characteristic of the resonator under this condition can be evaluated by the nonsteady solution. The coherent process is dominated by the transverse relaxation time. On the other hand, the incoherent process is dominated by the longitudinal relaxation time. But, generally, the transverse-relaxation time is shorter than or equal to the response time of the resonator, which is far shorter than the longitudinal relaxation time. In the off-resonant state in which the coherent process is dominant, the speed of switching-on or -off is about the response time of the generator, namely, an order of pico-second. On the other hand, in the region of the two-photon resonance in which the incoherent process is dominant, the speed of switching-on or -off is about the longitudinal relaxation tiem, namely, an order of nanosecond.

Figure 4A:
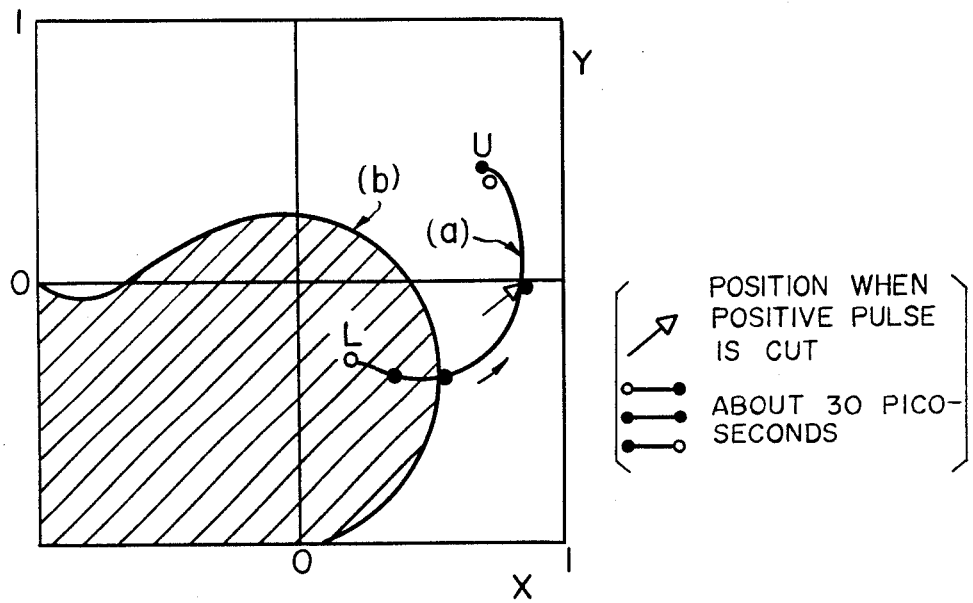

The dynamic characteristic of the resonator under coherent process is shown in FIG. 4(a), and FIG. 5(b), as the phase space diagram, wherein the length of the resonator is 10 μm, $\Delta_{off}$ is 0.5 meV, $\phi_o$ is −0.3 rad, and reflection R is 0.9. The X axis designates real of the inside electric field of the resonator, and the Y axis designates imaginary part of the inside electric field of the resonator. A unit of both the X coordinate axis and the Y coordinate axis corrsponds to 200 KW/cm².

Figure 4B:
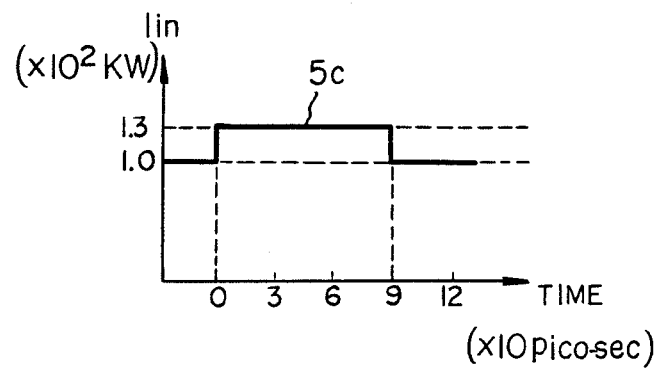

When the initial state is set at one point inside the shadowed portion, the resonator will be stabilized to the low transmitting state L which is determined according to the intensity of the holding light, as the time proceeds. On the other hand, when the initial state is set at one point outside the shadowed portion, the resonator will be stabilized to the high transmitting state U which is determind according to the intensity of the holding light, as the time proceeds. When the positive pulse light 5c as shown in FIG. 4(b) is irradiated to the resonator of the low transmitting state, the resonator will shift to the stable point under the incidence of both the holding light and the pulse light, a long the curve (a), as the time proceeds. At this time, when the positive pulse is cut after shifting across the divide shown with the curve (b), the resonator will shift to the stable point U (the high transmitting state) under the incidence of the holding light. Then, the switching-on will be finished. Similarly, when the negative pulse light 5d as shown in FIG. 5(b) is irradiated to the resonator of the high transmitting state U, the resonator will shift to the stable point under the incidence of both the holding light and the pulse light, along the curve (a), as the time proceeds. At this time, when the negative pulse is cut after shifting across the divide shown with the curve (b), the resonator will shift to the stable point L (the low transmitting state) under the incidence of the holding light. Then, the switching-off will be finished. The time required for shifting from L to U, or from U to L, is the time of switching-on or -off. The time of switching-on or -off is an order of pico-second, for the resonator with the thickness of about 1 μm.

From the analysis of the dynamic characteristic, the switching energy required for switching-on or -off can be obtained. In this invention, the amounts of energy less than pico-Joule is sufficient for the switching energy as shown in the example of this invention (H. Hanamura, T. Tokihiro., Solid Sstate Comm. to be published).

The optically controlling method

The Fabry-Perot resonator as shown in FIG. 2 is made, in which a crystal with both the exciton energy level and the excitonic molecule energy level is used as a medium, and a pair of reflective thin films are formed on the front and the back of the crystal.

It is desirable that the crystal is set to the temperature at which the excitonic molecule energy level can be sharply observed. For instance, for a crystal of CuCl, a temperature of less than 77° K. is appropriate.

As a source of incident light to the resonator a, good laser can be desirably employed which is coherent and has both the strong intensity and the narrow spectrum width in the region of the exciton energy level of the crystal (Eex). For instance, a dye laser can be employed which has variable wave length and a spectrum width less than 0.03 meV.

The optical bistability can be obtained by irradiating, to the crystal, a laser beam which has energy (E) less than $(Em/2 - \gamma m)$. Preferably, $E \leq (Em/2 - \Delta\nu - \gamma m)$, in which $\Delta\nu$ is the spectrum width of the laser beam used as incident light. More preferably, $(Em/2 - \phi\gamma m) \leq E \leq (Em/2 - \Delta\nu - \gamma m)$. Moreover preferably, $(Em/2 - 50\ \gamma m) \leq E \leq (Em/2 - \Delta\nu - 2\gamma m)$. Especially preferably, $(Em/2 - 25\ \gamma m) \leq E \leq (Em/2 - \Delta\nu - \gamma m)$.

By irradiating continuously and steadily, to the resonator, the above-mentioned light (holding light), the optical bistable state can be set to the resonator. Then, switching-on and -off between the high transmitting state and the low transmitting state can be performed by irradiating, to the resonator, pulse light with the duration as shown in FIG. 4(b) and FIG. 5(b). The above-mentioned control technique can be applied to logic circuits, and computation circuits for example. Furthermore, controlling such as light differential amplifiers, light limiters, for example are possible etc.

Effect of this invention

According to this invention, the optical bistability can be obtained which has excellent and improved advantages than as follows:

(i) The speed of switching-on or -off is on order to pico-second: second;
(ii) The switching energy is less than pico-Joule; and
(iii) The holding power is less than milliwatts.

Furthermore, this invention has the advantage that the mechanism of energy-dispersion is extremely weak, as the coherent process is utilized as the nonlinear optical response. That is, a rise of temperature of crystal can be nearly ignored. It is possible to integrate in large scale the optical bistable element.

Although the incoherent process is unstable for pulse oscillating and the occurrence of chaos, the coherent process of this invention is stable for pulse oscillating and the occurrence of chaos.

Utilizing the above-mentioned advantages, it is possible to fabricate the optical bistable element such as recording elements, computing elements, and logical elements, for example.

EXAMPLE

As the exciton-excitonic molecule system crystal, a single-crystal of CuCl is employed. From the peak of the one-photon absorption spectrum and the peak of the two-photon absorption spectrum, the exciton energy level (Eex) is 3.2022 eV, and the excitonic molecule energy level (Em) is 6.3722 eV.

Therefore, the stabilization energy required for forming the excitonic molecule (2Δ) is 32.2 meV. (T. Mita, et al., Solid State Comm., 33, 1135–1138 (1980)).

As the resonator, a Fabry-Perot resonator is employed in which a pair of reflective films with 0.9 of the reflective factor (R) are formed on the front and the back of the CuCl crystal as a medium. The temperature of the mediumis set at 4.2° K.

As an incident light to the resonator, a dye laser is employed which has a spectrum width (Δν) less than 0.03 meV, and a variable wave length in the region of the exciton energy level (Eex=3.20 eV). The area of the laser spot is 1 μm × 1 μm.

As the incident ray of the resonator, a laser beam with $(Em/2 - \Delta\nu - \gamma m)$ of energy is employed, by which the opticalbistability is obtained.

Then characteristic of the optical bistability when the extent of the off-resonance $(\Delta off = Em/2 - E)$ is 2.0, 1.0, 0.5, 0.3, and 0.1 meV, and the detunig $(\phi_o) = 0.3$ is obtained. As parameters contained in the equation of motion, the experimental relationship of dispersion between the exciton polariton and the excitonic measured by the hype-Raman scattering and experimental two-photon absorption coefficient measured by the the two-photon absorption spectrum is employed. Further as $\gamma m$ is dependent on the intensity of the irradiated light, experimental values obtained by the two photon absorption spectrum are employed. That is, $\gamma m = 0.008 + 6.0 \times 10^{-5} \times \ln$ (In is the holding power; KW). (I. Mita, et al., Solid State Comm., 33, 1135-1138 (1980); T. Mita, et al., J. Phys. Soc. Japan. 50, 134-144 (1981); T. Itoh, et al., J. Phys. Sos., 53, 844-853 (1984). The results are shown in Table 1 with comparative example. An example of the input-output characteristic of the resonator is shown in FIG. 3. Example in Table 1 and FIG. 3(a) show the coherent optical bistability in which $\Delta_{off} > (\Delta\nu + \gamma m)$, and comparative example in Table 1 and FIG. 3(b) show the incoherent optical bistability in which $\Delta_{off} < (\Delta\nu + \gamma m)$. An example of the dynamic characteristic of the resonator is shown in FIGS. 4 and 5.

As stated above, the coherent nonlinear optical response becomes dominant by irradiating, to a single-crystal of CuCl, light with energy with which the one-photon transition becomes off-resonant to the exciton and the two-photon transition to the exciton molecule becomes off-resonant, so that optical bistability which satisfies the above-mentioned three conditions can be obtained, and excellent optical control is preformed.

We claim:

1. An optical control method for obtaining optical bistability comprising;
    irradiating a crystal with both an exciton energy level and an excitonic molecule energy level, as the optical excitation energy level with a coherent incident light beam having energy (E) defined by $(Em/2 - 100\gamma m) \leq E \leq (Em/2 - \Delta\nu - \gamma m)$ in which Em is the excitonic molecule energy level and $\gamma$ is the half-amplitude level of absorption spectrum of two-photon resonance whereby a substantially coherent nonlinear optical response is obtained.

2. An optically controlling method as claimed in claim 1, wherein $(Em/2 - 50\gamma m) \leq E \leq (Em/2 - \Delta\nu 2\gamma m)$.

3. An optically controlling method as claimed in claim 1 wherein $(Em/2 - 25\gamma m) \leq E \leq (Em/2 - \Delta\nu - 3\gamma m)$.

4. An optically controlling method as claimed in claim 1, wherein the crystal is a copper-halide system crystal.

5. An optically controlling method as claimed in claim 1, wherein the crystal is a copper-halide system crystal selected from the group consisting of CuCl and CuBr.

6. An optically controlling method as claimed in claim 1, wherein the crystal is CuCl.

* * * * *

TABLE 1

$R = 0.9 \quad \phi_o = -0.3$

| | l ($\mu$m) | The extent of the non-resonance $\Delta_{off}$ (meV) | Holding power (kW/cm$^2$) | Switching on-off time (Picosecond) | Switching energy (Pico-Joule) | Width at half maximum of the two-photon absorption spectrum $\gamma_m$ (meV) | Coherent (c) or incoherent (i) |
|---|---|---|---|---|---|---|---|
| Example ① | 10 | 2.0 | $4.0 \times 10^2$ | $1.0 \times 10^2$ | $1.0 \times 10$ | $3.2 \times 10^{-2}$ | c |
| Example ② | 10 | 1.0 | $2.0 \times 10^2$ | $1.0 \times 10^2$ | 4.5 | $2.0 \times 10^{-2}$ | c |
| Example ③ | 10 | 0.5 | $1.0 \times 10^2$ | $1.0 \times 10^2$ | 2.7 | $1.4 \times 10^{-2}$ | c |
| Comparative example ① | 10 | 0.5 | $(1.8 \times 10^4)$ | $(5.0 \times 10^2)$ | | 1.1 | i |
| Example ④ | 10 | 0.3 | $5.9 \times 10$ | $1.0 \times 10^2$ | 1.3 | $1.2 \times 10^{-2}$ | c |
| Comparative example ② | 10 | 0.3 | $(1.0 \times 10^4)$ | $(5.0 \times 10^2)$ | | 0.6 | i |
| Example ⑤ | 10 | 0.1 | $1.9 \times 10$ | $1.0 \times 10^2$ | 0.4 | $9.1 \times 10^{-3}$ | c |
| Comparative example ③ | 10 | 0.1 | $(4.0 \times 10^3)$ | $(5.0 \times 10^2)$ | | 0.24 | i |
| Example ⑥ | 5.0 | 2.0 | $8.9 \times 10^2$ | $6.0 \times 10$ | $1.5 \times 10$ | $6.1 \times 10^{-2}$ | c |
| Example ⑦ | 5.0 | 1.0 | $4.5 \times 10^2$ | $6.0 \times 10$ | 7.6 | $3.5 \times 10^{-2}$ | c |
| Example ⑧ | 5.0 | 0.5 | $2.2 \times 10^2$ | $6.0 \times 10$ | 3.6 | $2.1 \times 10^{-2}$ | c |
| Example ⑨ | 1.0 | 1.0 | $2.4 \times 10^3$ | $1.0 \times 10$ | 9.9 | $1.5 \times 10^{-1}$ | c |
| Example ⑩ | 1.0 | 0.5 | $1.2 \times 10^3$ | $1.0 \times 10$ | 5.0 | $8.0 \times 10^{-2}$ | c |
| Example ⑪ | 1.0 | 0.3 | $7.2 \times 10^2$ | $1.0 \times 10$ | 3.0 | $5.1 \times 10^{-2}$ | c |